(12) United States Patent
Nishio

(10) Patent No.: US 6,513,839 B2
(45) Date of Patent: *Feb. 4, 2003

(54) PIPE JOINT MADE OF RESIN

(75) Inventor: Kiyoshi Nishio, Sanda (JP)

(73) Assignee: Nippon Pillar Packing Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/527,035

(22) Filed: Mar. 16, 2000

(65) Prior Publication Data

US 2002/0167169 A1 Nov. 14, 2002

(30) Foreign Application Priority Data

Mar. 29, 1999 (JP) .......................................... 11-085997

(51) Int. Cl.[7] .............................................. F16L 25/00
(52) U.S. Cl. ....................................... 285/331; 285/919
(58) Field of Search ............................ 285/331, 334.5, 285/342, 382.5, 389, 423, 919

(56) References Cited

U.S. PATENT DOCUMENTS

| | | | | |
|---|---|---|---|---|
| 2,545,263 A | * | 3/1951 | Corydon, II | ............ 285/919 X |
| 5,388,871 A | * | 2/1995 | Saitoh | ................... 285/342 X |
| 5,743,572 A | * | 4/1998 | Nishio | ......................... 285/331 |
| 5,951,060 A | * | 9/1999 | Fukano et al. | .......... 285/423 X |
| 6,089,621 A | * | 7/2000 | Nishio | ......................... 285/331 |
| 6,142,535 A | * | 11/2000 | Nishio et al. | ........... 285/331 X |

* cited by examiner

Primary Examiner—Greg Binda
(74) Attorney, Agent, or Firm—Jones, Tullar & Cooper, P.C.

(57) ABSTRACT

In a pipe joint made of resin, a cap nut-like pressing ring is screwed to the outer periphery of a pipe receiving port of a joint body, and presses an inner ring from the outer side of a pipe member as a result of screw advancement toward the joint body. The inner peripheral face of an annular pressing portion of the pressing ring is formed into a straight shape. The inner diameter D of the annular pressing portion is set to be 1.0 to 1.1 times, preferably, 1.01 to 1.05 times the outer diameter d of the pipe member, and the length L of the straight inner peripheral face portion in the axial direction is set to be 0.2 to 1.0 times, preferably, 0.2 to 0.8 times the outer diameter d of the pipe member, whereby the rotational resistance in a process of fastening the pressing ring is reduced, so that the loss of fastening torque can be reduced and a predetermined sealing force and a predetermined slipping off resistance can be ensured.

8 Claims, 3 Drawing Sheets

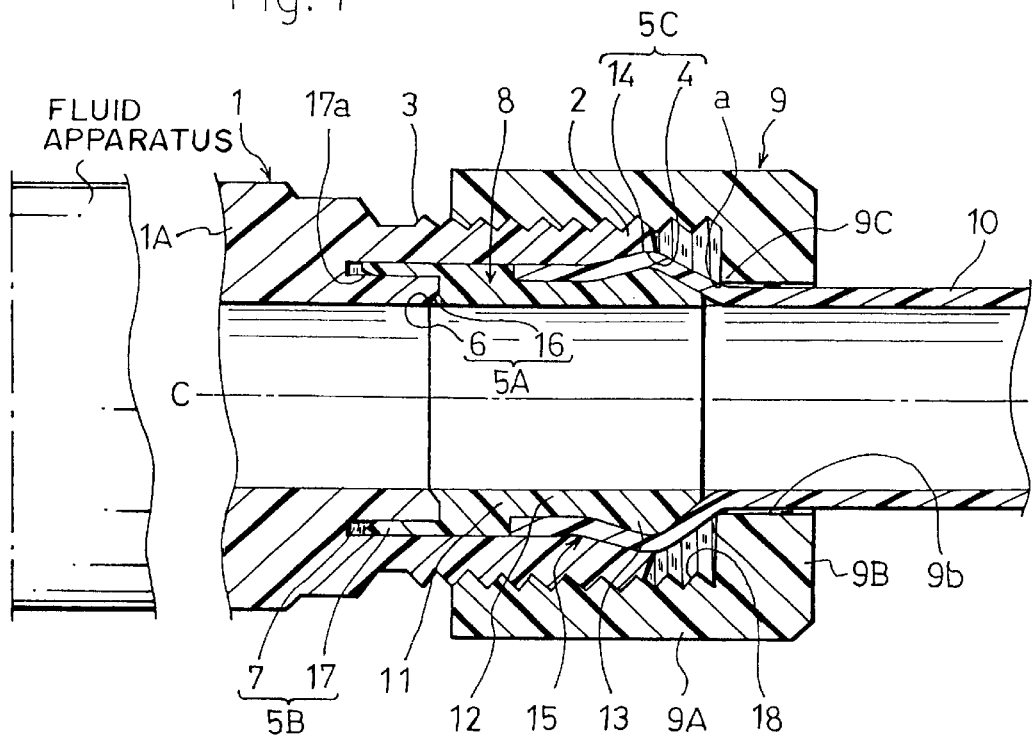
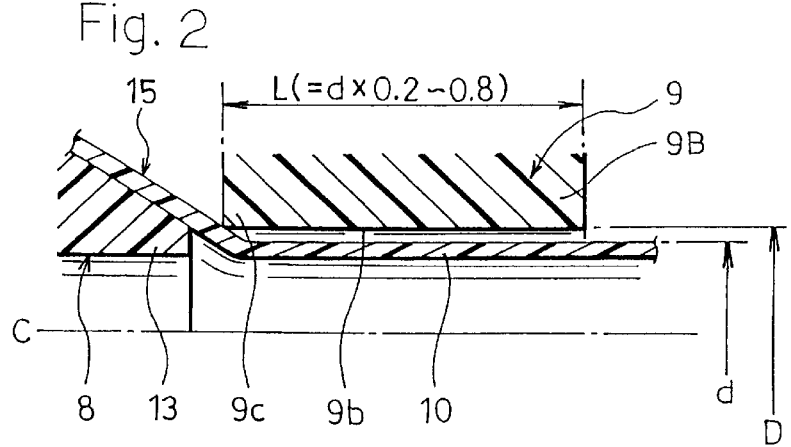

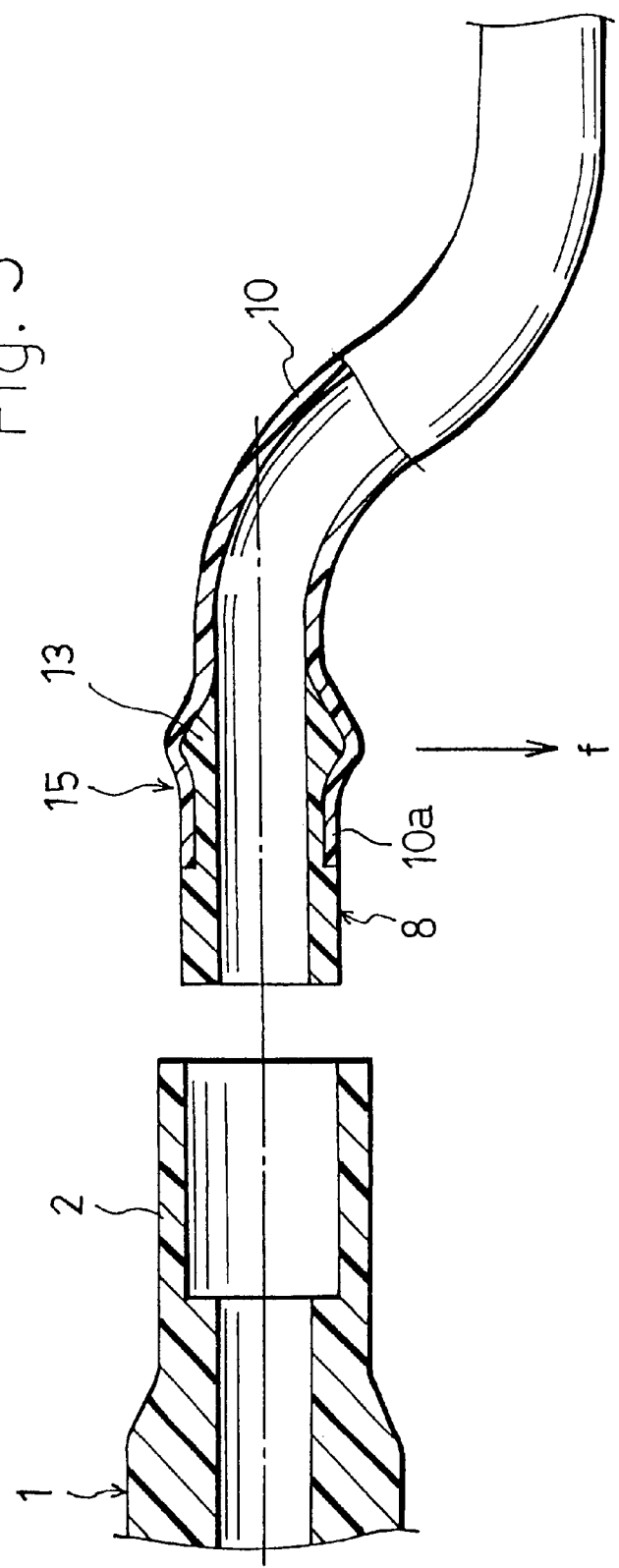

PIPE JOINT MADE OF RESIN

BACKGROUND OF THE INVENTION

1. Field of the Invention

The present invention relates to a pipe joint made of resin, and particularly to a pipe joint made of resin which is used in the connection of piping for a liquid having high purity or ultrapure water to be handled in a production process of various technical fields such as the production of semiconductor devices, the production of medical equipment and medicines, food processing, and for use in the chemical industry.

2. Description of the Prior Art

Conventionally, as pipe joints made of resin of this kind, those having a configuration shown in FIG. 3 are known. A conventional pipe joint made of resin shown in FIG. 3 comprises a cylindrical joint body 1 produced from resin having excellent chemical resistance and heat resistance, such as PFA, PTFE, and ETFE, a sleeve-like inner ring 8, and a cap nut-like pressing ring 9.

In the joint body 1, in the case where the joint body 1 is continuously integrated with a fluid apparatus which is not shown, a cylindrical pipe receiving port 2 is formed in one end in the axial direction, and, in the case where the joint body 1 is used for connecting together resin pipe members that will be described later, pipe receiving ports 2 are formed in the ends in the axial direction, respectively. An inclined sealing face 4 which elongates in a direction intersecting the axis C and forms a tertiary sealing portion 5C that will be described later is formed in the inlet of the pipe receiving port 2. An annular sealing end face 6 which forms a primary sealing portion 5A that will be described later is formed in an inner portion of the pipe receiving port 2. A cylindrical groove 7 which forms a secondary sealing portion 5B that will be described later is formed in a position which is outer than the annular sealing end face 6 in a radial direction. An external thread portion 3 is formed on the outer periphery of the pipe receiving port 2.

The sleeve-like inner ring 8 is formed so as to have an inner diameter which is equal to the inner diameters of a resin pipe member 10 and a cylinder portion 1A of the joint body 1, so as not to impede movement (flow) of a fluid. The inner ring has a fitting portion 11 in one end portion in the axial direction. The fitting portion can be fitted into the pipe receiving port 2 of the joint body 1. A bulge portion 13 which has a mountain-like section shape is formed on the outer periphery on the tip end side of a pipe member press insertion portion 12 which is formed continuously with the fitting portion 11. An insertion portion 15 of the pipe member 10 is formed which is to be inserted into the pipe receiving port 2 of the joint body 1, and which has an outer peripheral sealing face 14. When the press insertion portion 12 is pressingly inserted into one end portion of the pipe member 10 under a state where the fitting portion 11 projects from the end portion of the pipe member 10, the diameter of the peripheral wall of the pipe member 10 in a place corresponding to the bulge portion 13 is increased to cause the outer peripheral sealing face 14 to abut against the inclined sealing face 4 in the axial direction which is formed in the inlet of the pipe receiving port 2 of the joint body 1, thereby forming the tertiary sealing portion 5C.

In the fitting portion 11 which projects from the pipe member 10 of the inner ring 8, a protruding inner end face 16 is formed. When the insertion portion 15 of the pipe member 10 is inserted into the pipe receiving port 2 of the joint body 1, the protruding inner end face 16 abuts against the annular sealing end face 6 in the axial direction to form the primary sealing portion 5A. Each of the protruding inner end face 16 and the annular sealing end face 6 is formed into a tapered face in which the diameter is gradually reduced toward the inner periphery side. A cylindrical sealing portion 17 which projects more outwardly in the axial direction than the protruding inner end face 16 configured by a tapered face is integrally projected from a position of the protruding inner end face 16 on the outer side in a radial direction. The cylindrical sealing portion 17 is to be pressingly inserted into the cylindrical groove 7 to form the secondary sealing portion 5B. A chamfered portion 17a is formed at the tip end of the cylindrical sealing portion 17 so as to facilitate the pressing insertion of the sealing portion into the cylindrical groove 7.

In the cap nut-like pressing ring 9, an internal thread portion 18 which is to be screwed to the external thread portion 3 of the joint body 1 is formed in the inner peripheral face of a cylindrical portion 9A, and an annular pressing portion 9B is continuously integrated with an outer end portion of the cylindrical portion 9A. The annular pressing portion 9B elongates toward the axial center and externally presses the pipe member 10. An inner peripheral face 9b of the annular pressing portion 9B elongates along the axial direction and is formed into a funnel-like tapered face so as to form a pressing edge 9C in an inner edge position of the face.

In the thus configured pipe joint made of resin, the press insertion portion 12 of the inner ring 8 is pressingly inserted into the one end portion of the pipe member 10 to increase the diameter of the peripheral wall of the pipe member 10 in a place corresponding to the bulge portion 13 formed in the press insertion portion 12, whereby both the components 8 and 10 are integrally coupled together to form the insertion portion 15 of the pipe member 10.

The insertion portion 15 of the pipe member 10 is then inserted into the pipe receiving port 2 of the joint body 1 to advance the cylindrical sealing portion 17 of the inner ring 8 into the cylindrical groove 7 of the joint body 1.

Thereafter, the internal thread portion 18 of the pressing ring 9 which is loosely fitted onto and held on the outer side of the pipe member 10 is screwed to the external thread portion 3 of the joint body 1 to cause the pressing ring 9 to screwingly advance toward the joint body 1. Therefore, the inner ring 8 is pressed in the axial direction by the pressing edge 9C of the annular pressing portion 9B, so that the cylindrical sealing portion 17 of the inner ring 8 is inserted starting from the chamfered portion 17a at the tip end into the cylindrical groove 7 of the joint body 1. As a result, a contact pressure is generated between the inner and outer peripheral faces of the two components 7 and 17, thereby forming the secondary sealing portion 5B which elongates in the axial direction.

The pressing ring 9 is further screwingly advanced to be strongly tightened. As a result, the axial length of the secondary sealing portion 5B is increased, and the protruding inner end face 16 of the inner ring 8 abuts against the annular sealing end face 6 of the pipe receiving port 2 of the joint body 1 to generate a contact pressure in the axial direction between the components 16 and 6, thereby forming the primary sealing portion 5A. Furthermore, the outer peripheral sealing face 14 which is formed on the insertion portion 15 of the pipe member 10 abuts in the axial direction against the inclined sealing face 4 which is formed in the inlet of the pipe receiving port 2 of the joint body 1, thereby forming the tertiary sealing portion 5C. As a result, the pipe member 10 is connected to the joint body 1 under a slipping off preventing state and a sealed state.

As seen from the model view of FIG. 4, in the pipe joint made of resin of the conventional art, usually, no consideration is given to the dimension of the inner diameter To of the annular pressing portion 9B of the pressing ring 9 with respect to the outer diameter t of the pipe member 10, or the relationship of To<t is set. The inner peripheral face 9b of the annular pressing portion 9B is formed into a funnel-like tapered face which elongates in the axial direction and in which the pressing edge 9C in the inner end position has the smallest diameter. When the relationship of To<t is set, therefore, a resistance against the screwing rotation in the process of fastening the pressing ring 9 is generated, and the rotational torque is not converted as it is into a fastening force in the axial direction, thereby causing a problem in that a loss is produced in the fastening torque and the sealing force and the resistance against the slipping off are reduced.

In a pipe joint of this kind, connection is made without using an elbow or the like as shown in FIG. 5. When the pipe member 10 and the joint body 1 are no t coaxially placed, therefore, connection is sometimes made after an end portion 10a of the pipe member 10 is forcedly bent so as to be concentric with the joint body 1. In such a case, the bending force is applied against the rigidity of the pipe member 10, and hence a bending stress as indicated by f in FIG. 5 acts on the 10 end portion 10a of the pipe member 10. As a result, in a connection state, the pipe member end portion 10a is displaced in a direction along which the portion is separated from the pressing edge 9C of the annular pressing portion 9B in the pressing ring 9, thereby producing a problem in that the sealing force and the slipping off resistance are remarkably reduced.

SUMMARY OF THE INVENTION

The present invention has been conducted in view of the above-mentioned circumstances. It is an object of the present invention to provide a pipe joint made of resin in which the relationship between an annular pressing portion of a pressing ring and the outer diameter of a pipe member is improved to lower the rotational resistance in the processing of fastening the pressing ring, so that the loss of the fastening torque can be reduced and a predetermined sealing force and a predetermined slipping off resistance can be ensured.

In order to attain the objects, the pipe joint made of resin of the present invention is a pipe joint made of resin comprising: a sleeve-like inner ring (8) in which an inner periphery for movement of a fluid or preferably an inner periphery of a diameter that does not impede movement of the fluid is formed, and a bulge portion (13) is formed on an outer periphery in one end portion in an axial direction, and which is to be pressingly inserted into one end portion of a pipe member made of resin (10) to increase a diameter of a peripheral wall of the pipe member (10) in a place corresponding to the bulge portion (13), thereby forming an outer peripheral sealing face (14) for forming a sealing portion (5C); a joint body (1) in which a cylindrical pipe receiving port (2) into which an insertion portion (15) of the pipe member (10) formed by pressing insertion of the inner ring (8) is to be inserted is formed in at least one end portion in the axial direction, and an inclined sealing face (4) that elongates in a direction intersecting an axis and that, in accordance with insertion of the insertion portion (15), abuts against the outer peripheral sealing face (14) to form a sealing portion (5C) is formed; and a cap nut-like pressing ring (9) in which a cylindrical portion (9A) that is to be screwed to an outer periphery of the pipe receiving portion (2) of the joint body (1), and an annular pressing portion (9B) that elongates toward an axial center from one end portion in the axial direction of the cylindrical portion (9A) and that externally presses the pipe member (10) are continuously integrated with each other, the inner ring (8) being pressed from an outer side of the pipe member (10) by the annular pressing portion (9B) as a result of screw advancement of the pressing ring (9) toward the joint body (1), whereby the pipe member (10) is prevented from slipping off and a sealing force is provided, wherein an inner diameter (D) of the annular pressing portion (9B) of the pressing ring (9) is larger than an outer diameter (d) of the pipe member (10).

According to the present invention of the above configuration, since the inner diameter of the annular pressing portion of the pressing ring is larger than the outer diameter of the pipe member, substantially no resistance is exerted against rotation in the process of screwingly advancing the pressing ring toward the joint body to fasten the ring to the joint body, and hence the rotational torque itself can be converted into a fastening force in the axial direction. Consequently, the rotational resistance in a process of screwingly advancing the pressing ring toward the joint body to fasten the ring to the joint body can be substantially eliminated, and the rotational torque itself can be converted into a fastening force in the axial direction to reduce the loss of the fastening torque to a very low level while facilitating the connecting work, only by introducing improvement which is structurally simple and in which the inner diameter of the annular pressing portion of the pressing ring is set to be larger than the outer diameter of the pipe member. As a result, it is possible to attain an effect that the joint body and the pipe member can be connected to each other in a state where a predetermined sealing force and a predetermined slipping off resistance are ensured.

The inner peripheral face of the annular pressing portion of the pressing ring is formed over the whole length in the axial direction into a straight shape of a same diameter. According to this configuration, even when connection is made without using, for example, an elbow or the like after an end portion of the pipe member is forcedly bent against the rigidity so as to be concentric with the joint body, a momentum which uses the outer end portion of the annular pressing portion of the pressing ring as the fulcrum is generated in the annular pressing portion against a bending stress acting on the end portion of the pipe member, whereby an inner end portion of the annular pressing portion of the pressing ring is strongly pressed against the outer peripheral face of the pipe member so that the predetermined sealing force and the predetermined slipping off resistance can be surely exerted.

Preferably, the inner diameter of the annular pressing portion of the pressing ring is set to be 1.0 to 1.1 times, preferably, 1.01 to 1.05 times the outer diameter of the pipe member. When the inner diameter is larger than 1.1 times, the point where the pipe member is pressingly held by the tip end portion of the inner ring inserted into the pipe member and the annular pressing portion of the pressing ring is shifted toward the outer side in a radial direction, and a gap is formed between the inner ring and the pipe member. A liquid may stagnate in the gap. This is not preferable in a pipe joint made of resin which is used for transporting a liquid having high purity or ultrapure water. When the inner diameter is smaller than 1.0 time, a rotational resistance is generated as described in the example of the conventional art and a loss of the fastening torque is therefore produced in the fastening torque.

In the case where the inner peripheral face of the annular pressing portion of the pressing ring is formed into a straight shape, a length of the straight inner peripheral face portion in the axial direction is set to be 0.2 to 1.0 times, preferably 0.2 to 0.8 times the outer diameter of the pipe member. According to this configuration, even when concentric connection is made without using, for example, an elbow or the like after an end portion of the pipe member is forcedly bent against the rigidity so as to be concentric with the joint body while suppressing the axial length of the pipe joint to a value as small as possible so as to facilitate installation in a small place, an inner end portion of the annular pressing portion of the pressing ring is strongly pressed against the outer peripheral face of the end portion of the pipe member, so that a connection state in which predetermined sealing and slipping off preventing functions are ensured can be attained. When the length of the straight inner peripheral face portion in the axial direction is shorter than 0.2 times the outer diameter of the pipe member, the sealing property and the slipping off resistance are lowered in the case where a bending stress is produced in the pipe member. When the length is longer than 1.0 time, the dimension of the pressing ring in the axial length is so long that it is difficult to install and use the pipe joint in a small place.

Other objects and effects of the present invention will be more apparent from the following description of embodiments.

BRIEF DESCRIPTION OF THE DRAWINGS

FIG. 1 is a longitudinal sectional side view of the pipe joint made of resin of the present invention;

FIG. 2 is a model view of main portions of the pipe joint made of resin;

FIG. 5 is a schematic view showing a connection state in the case where a pipe joint made of resin and a joint body are not concentric with each other.

PREFERRED ENBODIMENTS OF THE INVENTION

Figure 3:
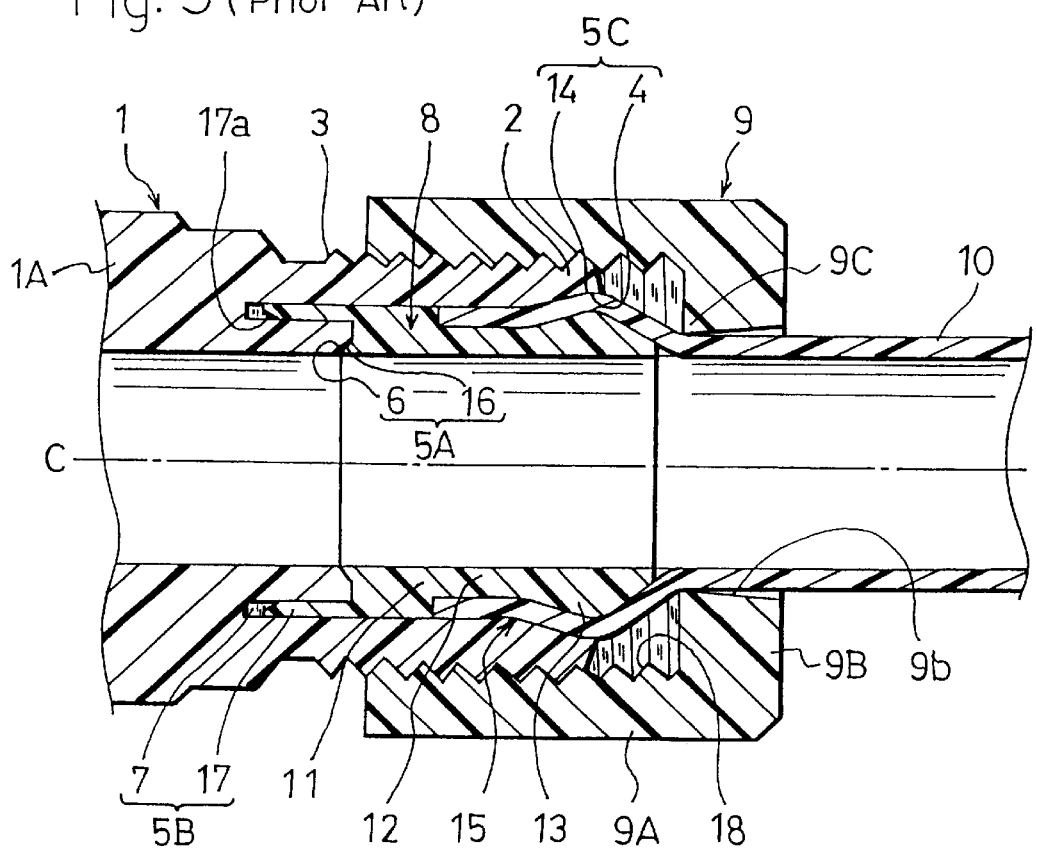
FIG. 3 is a longitudinal sectional side view of a pipe joint made of resin of the conventional art.
Figure 4:
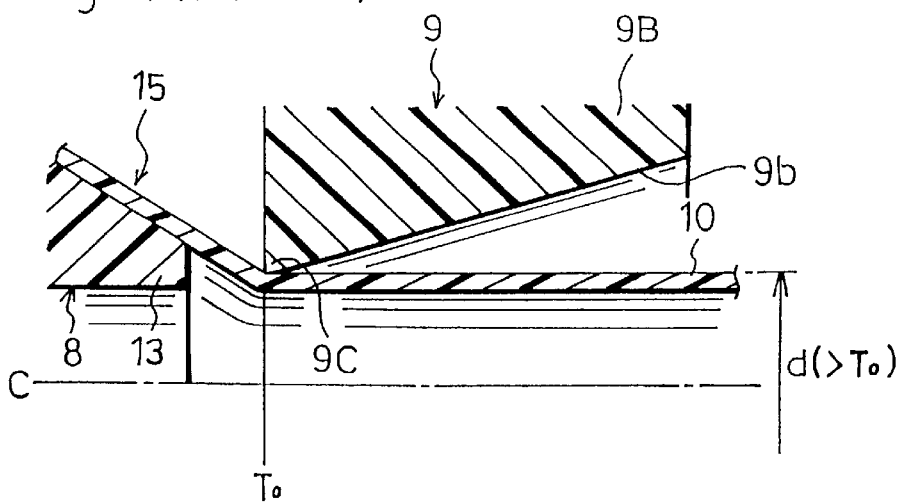
FIG. 4 is a model view of main portions of the pipe joint made of resin of the conventional art.

Hereinafter, an embodiment of the invention will be described with reference to the accompanying drawings.

FIG. 1 is a longitudinal sectional side view of the pipe joint made of resin of the present invention. The configuration of the pipe joint made of resin is basically identical to that of the conventional art example shown in FIG. 3. Therefore, identical and corresponding portions are denoted by the same reference numerals, and their description is omitted. In the following, descriptions will be made with placing a stress on portions which are different from those of the conventional art example.

The inner peripheral face 9b of the annular pressing portion 9B of the pressing ring 9 and including the pressing edge 9C in the inner end of the face is formed over the whole length in the axial direction into a straight shape of the same diameter. As shown in the model view of FIG. 2, the inner diameter D of the inner peripheral face 9b of the annular pressing portion 9B having such a straight shape is set to be 1.0 to 1.1 times, preferably, 1.01 to 1.05 times the outer diameter d of the pipe member 10. The length L of the straight portion of the inner peripheral face portion 9b in the axial direction is set to be 0.2 to 1.0 times, preferably 0.2 to 0.8 times the outer diameter d of the pipe member 10. Namely, $L = (d \times (0.2 \text{ to } 0.8))$.

In the same manner as the conventional art example shown in FIG. 3, in the pipe joint made of resin having such components 1, 2, and 9, the press insertion portion 12 of the inner ring 8 is pressingly inserted into one end portion of the pipe member 10 to increase the diameter of the peripheral wall of the pipe member 10 in a place corresponding to the bulge portion 13 formed in the press insertion portion 12, whereby both the components 8 and 10 are integrally coupled together to form the insertion portion 15 of the pipe member 10. The insertion portion 15 is then inserted into the pipe receiving port 2 of the joint body 1 to advance the cylindrical sealing portion 17 of the inner ring 8 into the cylindrical groove 7 of the joint body 1.

Thereafter, the internal thread portion 18 of the pressing ring 9 which is previously loosely fitted onto and held on the pipe member 10 is screwed to the external thread portion 3 of the joint body 1 to cause the pressing ring 9 to screwingly advance toward the joint body 1. Therefore, the inner ring 8 is pressed in the axial direction by the pressing edge 9C of the annular pressing portion 9B, so that the cylindrical sealing portion 17 of the inner ring 8 is pressingly inserted into the cylindrical groove 7 of the joint body 1. As a result, a contact pressure is generated between the inner and outer peripheral faces of the two components 7 and 17, thereby forming the secondary sealing portion 5B which elongates in the axial direction. The pressing ring 9 is further screwingly advanced to be strongly tightened. As a result, the axial length of the secondary sealing portion 5B is increased, and the protruding inner end face 16 of the inner ring 8 abuts against the annular sealing end face 6 of the pipe receiving port 2 of the joint body 1 to generate a contact pressure in the axial direction between the components 16 and 6, thereby forming the primary sealing portion 5A. Furthermore, the outer peripheral sealing face 14 which is formed on the insertion portion 15 of the pipe member 10 abuts in the axial direction against the inclined sealing face 4 which is formed in the inlet of the pipe receiving port 2 of the joint body 1, to form the tertiary sealing portion 5C. As a result, the pipe member 10 is connected to the joint body 1 under a slipping off preventing state and a sealed state.

In the connecting process, since the inner diameter D of the inner peripheral face 9b of the annular pressing portion 9B of the pressing ring 9 is set to be 1.01 to 1.05 times the outer diameter d of the pipe member 10, the rotational resistance in a process of screwingly advancing the pressing ring 9 toward the joint body 1 to fasten the ring to the joint body can be substantially eliminated. Therefore, the rotational torque itself can be converted into a fastening force in the axial direction to reduce the loss of the fastening torque to a very low level. As a result, the joint body 1 and the pipe member 10 can be connected to each other in a state where a predetermined sealing force and a predetermined slipping off resistance are ensured. In the connection state, a point a where the pipe member is pressingly held by the tip end portion of the inner ring 8 and the pressing edge 9C of the pressing ring 9 is prevented from being shifted toward the outer side in a radial direction, and a gap is not formed between the inner peripheral face of the inner ring 8 and that of the pipe member 10. As a result, a liquid is prevented from stagnating there.

Furthermore, the inner peripheral face 9b of the annular pressing portion 9B of the pressing ring 9 is formed into a straight shape, and the length L of the straight portion in the axial direction is set to be 0.2 to 0.8 times the outer diameter d of the pipe member 10. In the case where the pipe member 10 and the joint body 1 are not coaxially placed, even when connection is made without using an elbow or the like after the end portion 10a of the pipe member 10 is forcedly bent so as to be concentric with the joint body 1 as shown in FIG. 5, therefore, a momentum which uses the outer end portion of the annular pressing portion 9B of the pressing ring 9 as the fulcrum is generated in the annular pressing portion against a bending stress acting on the end portion 10a of the pipe member 10. As a result, the pressing edge 9C at the inner end of the annular pressing portion 9B is strongly pressed against the outer peripheral face of the pipe member 10, so that a connection state in which predetermined sealing and slipping off preventing functions are ensured can be attained.

In the above, the embodiment having the configuration in which the primary to tertiary sealing portions 5A to 5C are formed has been described. Also when the invention is applied to a configuration in which only the tertiary sealing portion 5C is formed, the same sealing and slipping off preventing functions as those described above can be attained.

In the embodiment described above, the cylindrical pipe receiving port 2 is formed only in one end in the axial direction of the joint body 1, or the joint body 1 is continuously integrated with a fluid apparatus. Also when the invention is applied to a configuration in which a cylindrical pipe receiving port is formed in each of the ends in the axial direction and the pipe members 10 are respectively inserted and connected to the pipe receiving ports, the same sealing and slipping off preventing functions as those described above can be attained.

The entire disclosure of Japanese Patent Application No. 11-085997 filed on Mar. 29, 1999 including specification, claims, drawings and summary are incorporated herein by reference in its entirety.

What is claimed is:

1. A pipe joint made of resin and defining an axial direction, said pipe joint comprising:

a sleeve-like inner ring in which an inner periphery for movement of a fluid is formed, a bulge portion is formed on an outer periphery in one end portion in an axial direction, which is to be pressingly inserted into one end portion of a pipe member made of resin to increase a diameter of a peripheral wall of said pipe member in a place corresponding to the bulge portion, thereby forming an outer peripheral sealing face for forming a sealing portion and an outer peripheral face is formed inwardly of said bulge portion which extends into a straight shape in the axial direction;

a joint body including a cylindrical pipe receiving port formed in one end portion in said axial direction, into which an insertion portion of said pipe member, formed by pressing insertion of said inner ring, is to be inserted, and an inclined sealing face that elongates in a direction intersecting an axis and that, in accordance with insertion of said insertion portion, abuts against said outer peripheral sealing face to form a sealing portion formed on an inlet of said pipe receiving port; and a cap nut-like pressing ring in which a cylindrical portion that is to be screwed to an outer periphery of said pipe receiving port of said joint body, and an annular pressing portion that elongates toward an axial center from one end portion in the axial direction of said cylindrical portion and that externally presses said pipe member made of resin are continuously integrated with each other, said inner ring being pressed from an outer side of said pipe member by said annular pressing portion as a result of screw advancement of said pressing ring toward said joint body, whereby said pipe member is prevented from slipping off and a sealing force is provided, wherein:

an inner peripheral face of said annular pressing portion of said pressing ring includes a pressing edge at an inner end of said inner peripheral face said inner peripheral face being formed in said axial direction into a straight shape of the same diameter as that of said pressing edge and of the same diameter as said outer peripheral face of said sleeve-like inner ring; and an inner diameter of said annular pressing portion of said pressing ring is 1.0 to 1.1 times an outer diameter of said pipe member made of resin.

2. A pipe joint made of resin according to claim 1, wherein a cylindrical pipe receiving port is formed in each of end portions in the axial direction of said joint body.

3. A pipe joint made of resin according to claim 1, wherein a cylindrical pipe receiving port, is formed in one end portion in the axial direction of said joint body, and another end portion is continuously integrated with a fluid apparatus.

4. A pipe joint made of resin according to claim 1, wherein an annular sealing end face and a protruding inner end face are respectively formed in an inner portion of said pipe receiving port of said joint body, and another end portion in the axial direction of said inner ring, said annular sealing end face and said protruding inner end face abutting in the axial direction against each other to form a primary sealing portion when said insertion portion of said pipe member is inserted into said pipe receiving port of said joint body.

5. A pipe joint made of resin according to claim 4, wherein: a cylindrical groove is formed in a position which is further outward than said annular sealing end face of said joint body in a radial direction; a cylindrical sealing portion which projects outward in said axial direction further than said protruding inner end face is formed in a position of said protruding inner end face on an outer side in a radial direction; and said cylindrical sealing portion is pressingly inserted into said cylindrical groove and advanced in said axial direction, whereby a secondary sealing portion which elongates in said axial direction is formed between said inner ring and said joint body.

6. A pipe joint made of resin according to claim 1, wherein the inner diameter of said annular pressing portion of said pressing ring is 1.0 to 1.05 times the outer diameter of said pipe member made of resin.

7. A pipe joint made of resin and defining an axial direction, said pipe joint comprising:

a sleeve-like inner ring in which an inner periphery for movement of a fluid is formed, a bulge portion is formed on an outer periphery in one end portion in an axial direction, which is to be pressingly inserted into one end portion of a pipe member made of resin to increase a diameter of a peripheral wall of said pipe member in a place corresponding to the bulge portion, thereby forming an outer peripheral sealing face for forming a sealing portion and an outer peripheral face is formed inwardly of said bulge portion which extends into a straight shape in the axial direction;

a joint body including a cylindrical pipe receiving port formed in one end portion in said axial direction, into which an insertion portion of said pipe member, formed by pressing insertion of said inner ring, is to be inserted, and an inclined sealing face that elongates in a direction intersecting an axis and that, in accordance with insertion of said insertion portion, abuts against said outer peripheral sealing face to form a sealing portion is formed on an inlet of said pipe receiving port; and a cap nut-like pressing ring in which a cylindrical portion that is to be screwed to an outer periphery of said pipe receiving port of said joint body, and an annular pressing portion that elongates toward an axial center from one end portion in the axial direction of said cylindrical portion and that externally presses said pipe member made of resin are continuously integrated with each other, said inner ring being pressed from an outer side of said pipe member by said annular pressing portion as a result of screw advancement of said pressing ring toward said joint body, whereby said pipe member is prevented from slipping off and a sealing force is provided, wherein:

an inner diameter of said annular pressing portion of said pressing ring is larger than an outer diameter of said pipe member made of resin;

an inner peripheral face of said annular pressing portion of said pressing ring includes a pressing edge at an inner end of said inner peripheral face said inner peripheral face being formed in said axial direction into a straight shape of the same diameter as that of said pressing edge and of the same diameter as said outer peripheral face of said sleeve-like inner ring; and a length of said straight inner peripheral face portion of the annular pressing portion of said pressing ring in the axial direction is 0.2 to 1.0 times an outer diameter of said pipe member made of resin.

8. A pipe joint made of resin according to claim 1, wherein the length of said straight inner peripheral face portion of the annular pressing portion of said pressing ring in the axial direction is 0.2 to 0.8 times the outer diameter of said pipe member made of resin.

\* \* \* \* \*